United States Patent [19]

Massey

[11] Patent Number: 4,976,413

[45] Date of Patent: Dec. 11, 1990

[54] MECHANICAL JACKING DEVICE

[76] Inventor: Navarre A. Massey, Box 1299, Fort Macleod, Alberta, Canada, T0L 0Z0

[21] Appl. No.: 442,002

[22] Filed: Nov. 28, 1989

[51] Int. Cl.[5] .............................................. F16H 29/02

[52] U.S. Cl. ................................ 254/95; 254/DIG. 6

[58] Field of Search ...................... 254/95, 97, 4 R, 47, 254/DIG. 6; 74/89, 21, 250, 501 R, 501.5 R, 502; 414/18, 14–16, 214, 46; 198/395, 321, 678

[56] References Cited

U.S. PATENT DOCUMENTS 2,896,904 7/1959 Stone ............................ 254/DIG. 6

4,830,337 5/1989 Ichiro et al. .................. 254/DIG. 6

FOREIGN PATENT DOCUMENTS 237370 6/1969 U.S.S.R. ....................... 254/DIG. 6

*Primary Examiner*—Robert C. Watson

*Attorney, Agent, or Firm*—George Haining Dunsmuir

[57] ABSTRACT

A relatively simple jack which can be manually operated using a wrench or mechanically operated using a driven socket wrench includes an elongated, upwardly tapering, square cross section casing, with a slot extending longitudinally of one side wall thereof, an endless chain mounted on sprockets at the top and bottom ends of the casing, and an off-the-shelf slack adjuster mounted on an upper side wall of the casing for driving the chain, which is engaged by a pawl having a load support arm extending outwardly through the slot in the front wall of the casing. By rotating the worm gear drive of the slack adjuster, the load support arm can be caused to move vertically in the slot to raise or lower a load.

5 Claims, 2 Drawing Sheets

MECHANICAL JACKING DEVICE

BACKGROUND OF THE INVENTION

This invention relates to a jack, and in particular to a jack for a vehicle or another heavy load.

In general, jacks are mechanical structures including some form of rack and a pawl engaging the rack for movement therealong. Because all of the elements of existing jacks including the drive thereof are usually manufactured from scratch and are often somewhat complicated, the device may be expensive.

The present inventor is aware of patented jacks having features in common with the invention proposed herein. The jacks in question are described in U.S. Pat. Nos. 169,139, which issued to M. J. Walsh on Oct. 26, 1875; 1,610,850, which issued to F. A. Davidson on Dec. 14, 1926; 2,189,665, which issued to I. Kirby on Feb. 6, 1940 and 2,222,243, which issued to O. E. Sandstrom on Nov. 19, 1940. The patented devices are of interest, because they include mechanisms bearing some, albeit remote, similarity to the device proposed by applicant.

The object of the present invention is to solve the above-identified problem while improving on existing jack structures by providing a relatively simple jack which is produced from readily available, off-the-shelf hardware, and which can be operated manually or by means of a pneumatically, hydraulically or electrically operated socket wrench.

BRIEF SUMMARY OF THE INVENTION

Accordingly, the present invention relates to a jack for a vehicle or another heavy load comprising elongated casing means; slot means extending longitudinally of one wall of said casing means; pawl means slidable in said slot means between the ends thereof; support arm means extending outwardly from said pawl means for supporting a load; endless chain means in said casing means engaging said pawl means for moving the pawl means and said support arm means in said slot means; and slack adjuster means on said casing means for driving said chain means, whereby, in use, the support arm means can be moved vertically in said slot means between raised and lowered positions.

The present invention is based on the discovery that an off-the-shelf slack adjuster of the type including a worm gear can be used in combination with a chain drive to produce a simple jack structure. Since the slack adjuster comes equipped with a bolt for operating the adjuster, it is a simple matter to turn the bolt manually using a simple crank or mechanically using a pneumatic, hydraulic or electrical socket wrench in order to operate the jack.

BRIEF DESCRIPTION OF THE DRAWINGS

The invention will be described in greater detail with reference to the accompanying drawings, which illustrate a preferred embodiment of the invention and wherein.

DESCRIPTION OF THE PREFERRED EMBODIMENT(S)

Figure 1:
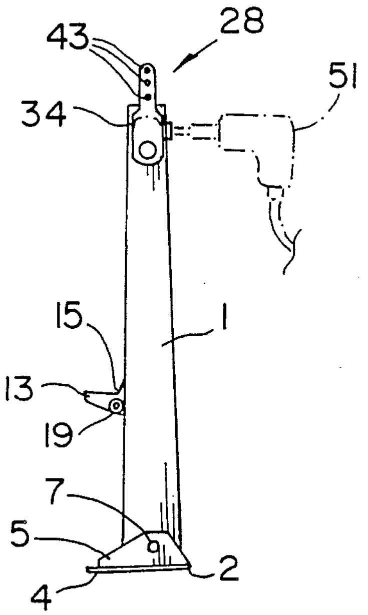
FIG. 1 is a side elevational view of a jack in accordance with the present invention.

With reference to the drawings, the jack of the present invention includes an elongated, tubular casing 1 of square cross section which tapers upwardly slightly from a base 2. The base is defined by a bottom plate 4 and a pair of upwardly tapering arms 6 which define a clevis-like support for the casing 1. A threaded shaft 7 extends through aligned holes 8 and 9 in the bottom end of the casing 1 and in the arms 6, respectively.

Figure 2:
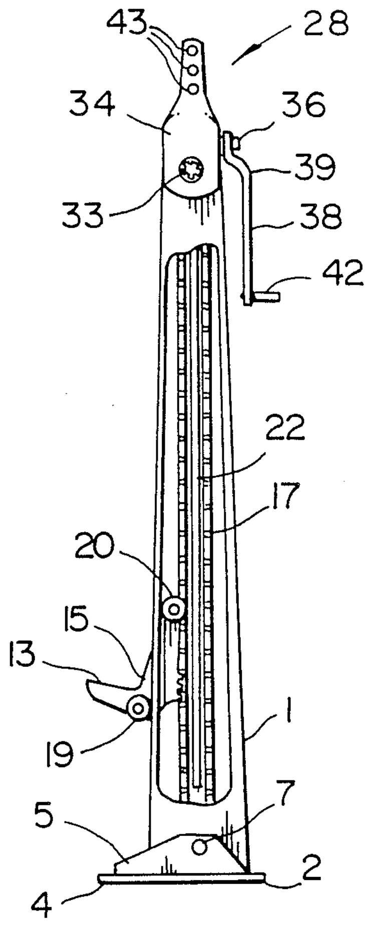
FIG. 2 is a partly sectioned, side view of the jack of FIG. 1 on a larger scale.

A rectangular slot 12 extends the entire length of open side of the casing 1, permitting longitudinal movement of a load support arm 13, which defines the base of a generally L-shaped pawl 15. As best shown in FIG. 2, the pawl 15 is slidably mounted in the slot 12, so that teeth 16 on the inner or rear edge thereof engage an endless chain 17. Bottom rollers 19 on the pawl 15 bear against the outside of the casing 1 on each side of the slot 12, and top rollers 20 extend beyond the sides of the chain 17 to bear against an internal elongated plate 22 connected to and extending across the width of the casing 1, which acts as a roller track and as a chain guide.

Figure 3:
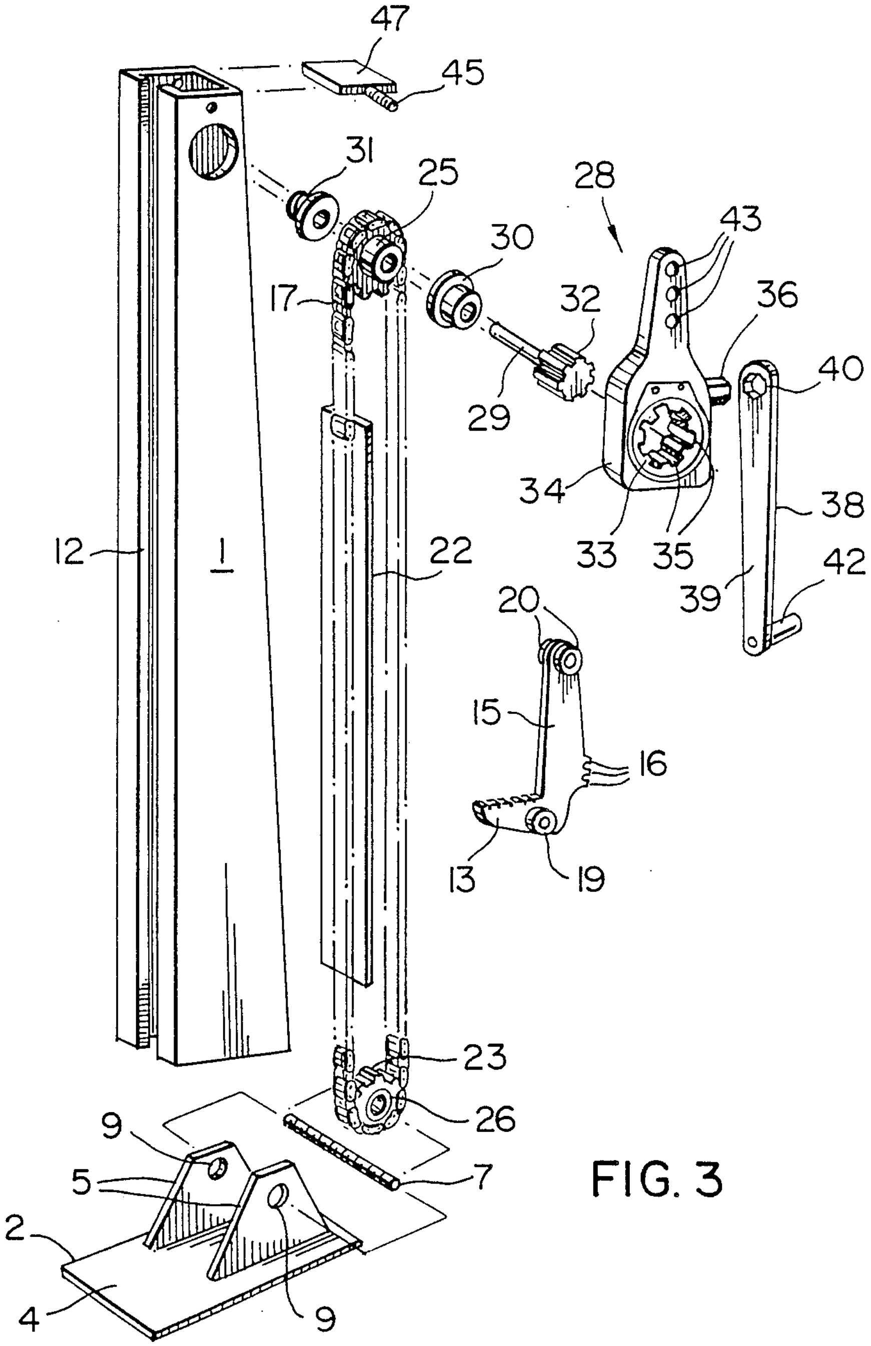
FIG. 3 is a an exploded, perspective view of the jack of FIG. 1.

As will be seen from FIGS. 2 and 3, the present invention provides for the simple relocation of pawl 15 and load support arm 13 without requiring movement of chain 17. To disengage teeth 16 from chain 17, support arm 13 is manually pulled outwardly and upwardly. Roller 20 bears against the inside of plate 22 which serves as a track to permit the now free pawl 15 to be vertically moved to a new location whenever teeth 16 are re-engaged with the chain 17.

The chain 17 is mounted on a lower, idler sprocket 23 and an upper, drive sprocket 25. A bearing 26 is provided in the centre of the sprocket 23 for rotatably mounting the latter on the shaft 7. The sprocket 25 is driven by a slack adjuster generally indicated at 28. A shaft 29 extends from the slack adjuster 28 on one side of the casing 1 through aligned bearings 30 and 31 mounted in the sides of the casing and through the sprocket 25. The sprocket 25 is keyed on the shaft 29 for rotation therewith. Longitudinally extending splines 32 are provided on the outer end of the shaft 29 for engaging a ring gear 33 in the slack adjuster 28.

Figure 4:
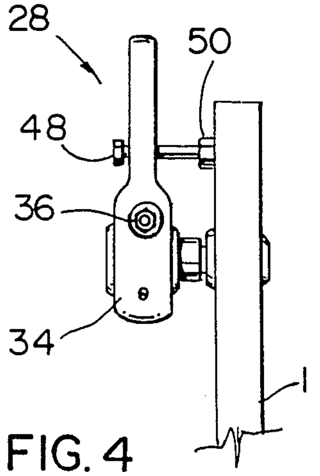
FIG. 4, which appears on the first sheet of drawings, is a rear view of the top end of a device similar to the device of FIGS. 1 to 3.

The slack adjuster 28 is an off-the-shelf item which includes the ring gear 33 rotatably mounted in the body 34 of the adjuster 28 and a worm (not shown) engaging teeth (not shown) on the outer periphery of the gear 33 for rotating the latter. Grooves 35 are provided in the inner periphery of the gear 33 for receiving the splines 32. The worm is on the inner end of the bolt 36, which in turn is rotated by a simple crank 38. The crank 38 includes a level 39 with a hexagonal hole 40 in one end for engaging the bolt 36 and a handle 42 on the other end thereof. Holes 43 in the elongated top end of the slack adjuster 28 receive a threaded pin 45 for securing the slack adjuster 28 on the casing 1. The pin 45 extends outwardly from a cover 47 mounted in the top end of the casing 1, and a nut (not shown) is provided on the pin 45. Alternately, as shown in FIG. 4, a bolt 48 can be inserted through one of the holes 43 into a nut 50 on one side of the top end of the casing 1.

In operation, to raise or lower the support arm 13, the bolt 36 is rotated using the crank 38, an electric drill 51

(FIG. 1) with a socket attached thereto or an air wrench (not shown). Rotation of the bolt 36 causes rotation of the worm and of the ring gear 33. Such rotations transmitted by the shaft 29 to the drive sprocket 25 to cause the chain 17 to move around the sprockets 25 and 26, with accompanying upward or downward movement of the load support arm 13.

What I claim is:

1. A jack for a vehicle or another heavy load comprising elongated casing means; slot means extending longitudinally of one wall of said casing means; panel means slidable in said slot means between the ends thereof; support arm means extending outwardly from said panel means for supporting a load; roller means on said panel means and on said support arm means movably supporting said panel means in said casing means for vertical movement in said slot means; endless chain means in said casing means engaging said panel means for moving the panel means and said support arm means in said slot means; and slack adjuster means on said casing means for driving said chain means, whereby in use, the support arm means can be moved vertically in said slot means between raised and lowered positions.

2. A jack according to claim 1, wherein support arm means is integral with said pawl means.

3. A jack according to claim 1, including plate means in said casing means perpendicular to said slot means for guiding said chain means in said casing means.

4. A jack according to claim 3, wherein said roller means include a first pair of rollers in said casing means in contact with said plate means, and a second pair of rollers on said support arm means for riding on the outside of said casing means on each side of said slot means.

5. A jack according to claim 4, wherein said casing means tapers upwardly from the bottom to the top end thereof, said slot means extending between said bottom and top ends of the casing means in one side thereof.

* * * * *